May 3, 1932.  A. E. KNOWLES  1,856,393
ELECTROLYTIC CELL
Filed Aug. 7, 1926   3 Sheets-Sheet 2
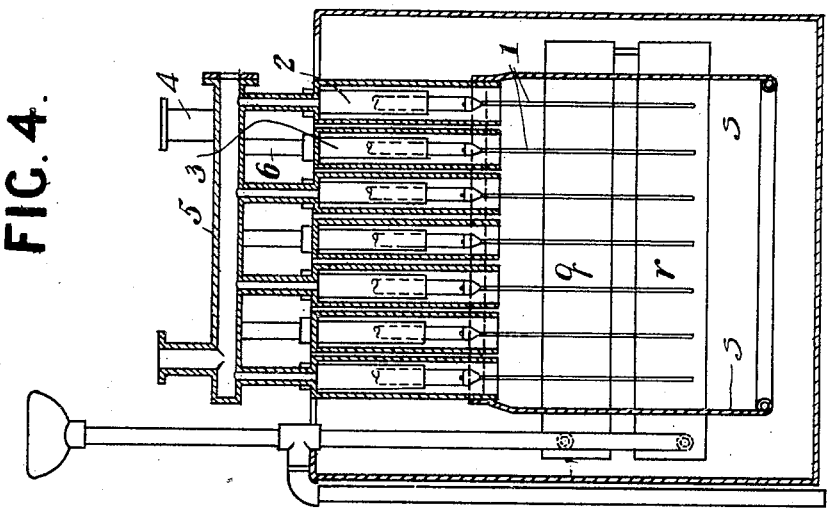
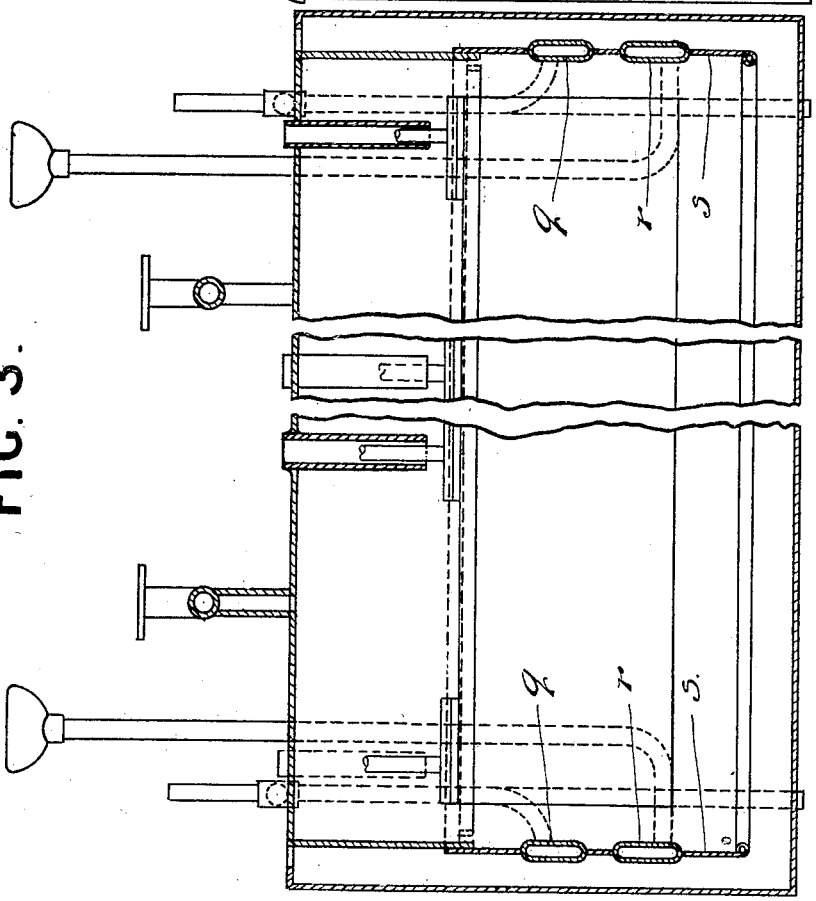
Inventor.
A. E. Knowles.
by Fetherstonhaugh & Co
Attys.

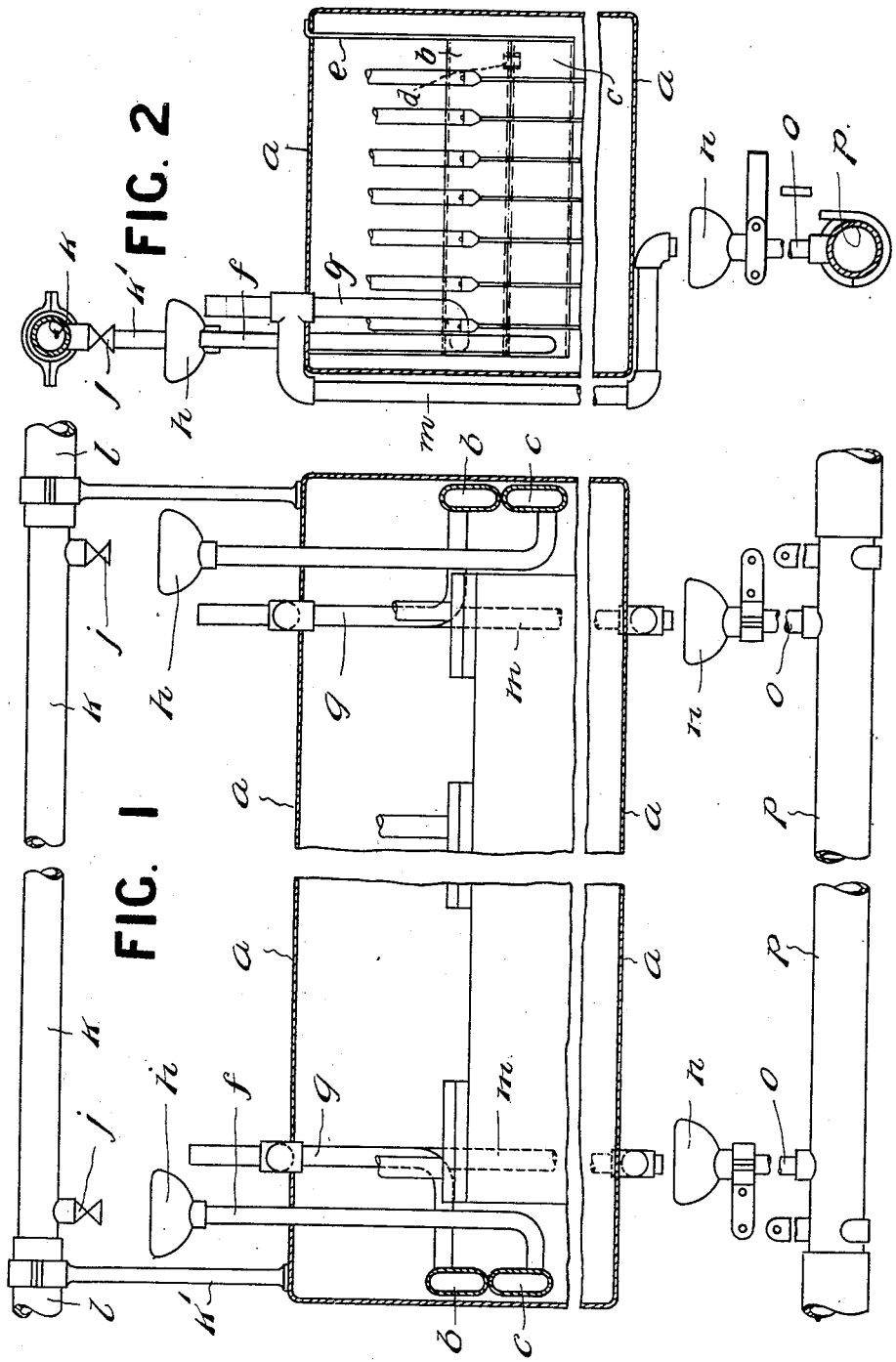

May 3, 1932.  A. E. KNOWLES  1,856,393
ELECTROLYTIC CELL
Filed Aug. 7, 1926   3 Sheets-Sheet 3
FIG. 6
FIG. 7
FIG. 5
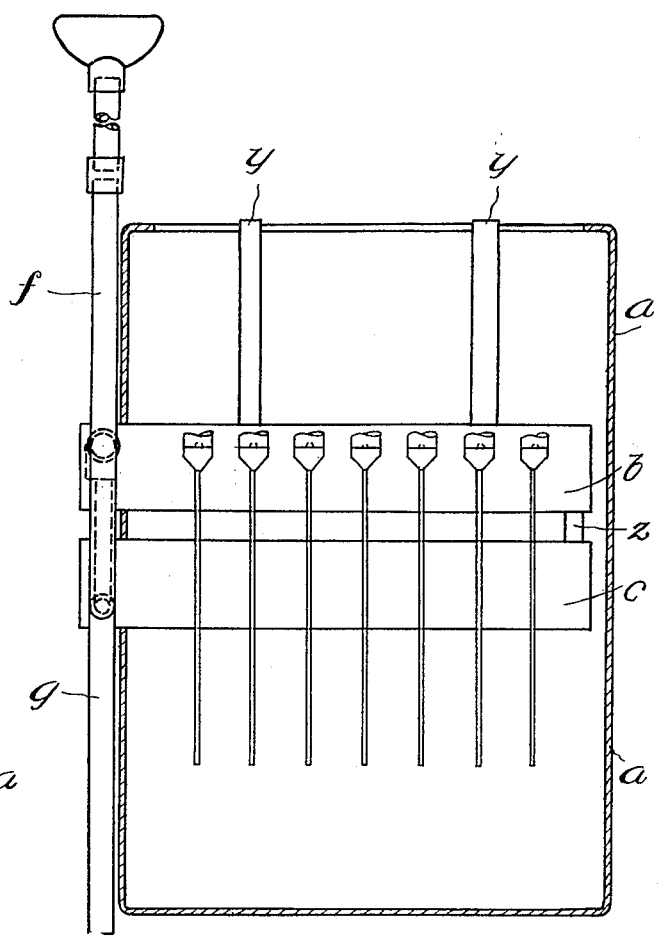
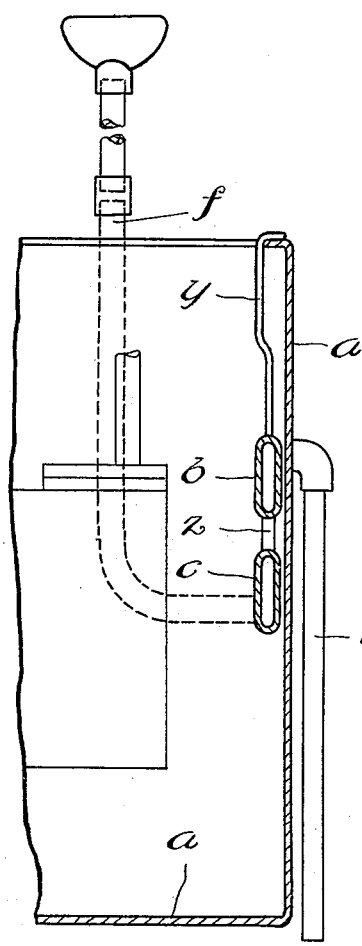
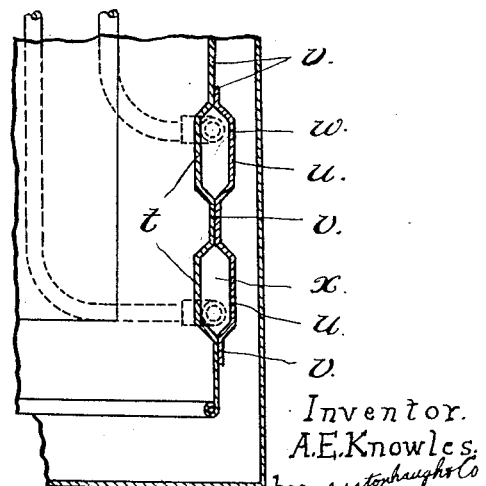
Inventor.
A.E. Knowles.
by Fetherstonhaugh & Co
Attys.

Patented May 3, 1932

1,856,393

UNITED STATES PATENT OFFICE

ALBERT EDGAR KNOWLES, OF HESWALL, CHESHIRE, ENGLAND

ELECTROLYTIC CELL

Application filed August 7, 1926, Serial No. 127,918, and in Great Britain August 11, 1925.

This invention relates to improvements in electrolytic cells, and refers particularly to means for maintaining the electrolyte at any desired temperature.

In electrolytic apparatus, such for example as employed for the production of oxygen and hydrogen by the electrolytic decomposition of water, a very heavy current is frequently employed and in working the temperature of the electrolyte rises and causes fluctuations in the current density passing through the cells.

Also, unless there is free circulation of the electrolyte, the temperature tends to vary at different points in the cell and the current density varies over different electrodes and over different areas of the same electrode if the electrodes are of large area.

To enable the cells to be worked at the maximum efficiency it is desirable that means should be provided for controlling the temperature of the electrolyte, and for maintaining the whole of the electrolyte as nearly as possible at the same temperature, and the object of my invention is to provide simple but effective means for achieving this end.

At first sight the solution appears obvious, namely, to apply cooling and heating units along the sides of the cell, but experiment shows that such a method is of no utility and is in fact a disadvantage, as in such a case the cooling or heating coils are parallel to the outside electrodes and these receive practically the whole effect, so that the temperature and current variations instead of being nullified are enhanced and the current balance throughout the cell is upset.

If the coils are placed below the electrodes a similar result occurs between the portions of the electrode which are at a higher level in the electrolyte.

My invention consists in providing a temperature controlling system in the form of tubes or coils of tubing through which cold or hot fluid can be circulated, and which are arranged across the ends of the cell adjacent to the ends of the electrodes, and at right angles to the planes of the electrodes. The heating or cooling effect is thus applied equally to all the electrodes and to the electrolyte between them, when the electrodes consist, as is usual, of a series of parallel plates.

Preferably the circulating system within the cell consists of flattened tubes superimposed and with their major axes of cross-section vertical to present a flat surface of substantial area to the ends of the electrodes. This arrangement also keeps down the space occupied in the cell by the tubes and hence the overall dimensions and weight of the cell.

Preferably also the system at each end of the cell comprises a flow and return of the heating or cooling fluid to the same side of the cell to counteract any temperature change in the fluid in passing from one side of the cell to the other.

Some practical forms of my invention as applied to cells for the production of oxygen and hydrogen by electrolytic decomposition of water are illustrated as examples in the accompanying drawings in which:—

Figures 1 and 2 are longitudinal and transverse sections respectively through a cell, showing the supply and discharge systems for the cooling water.

Figures 3 and 4 are similar sections showing an alternative construction for the circulating tubes.

Figure 5 is a fragmentary section of a further modified form of circulating tube.

Figures 6 and 7 are a longitudinal and a fragmentary transverse section respectively through a cell showing an alternative method of arranging the circulating tubes.

In Figs. 1 and 2 the electrolytic cell is indicated in outline at $a$. The principal part of the circulating system is formed by pairs of flattened tubes $b$, $c$, arranged one above the other and mounted transversely within the cell at each end adjacent to the ends of the electrodes. The tubes are connected together at one end by a short pipe $d$ and are supported at this end by a strap $e$ depending from the top of the cell.

A delivery pipe $f$ enters the lower tube $c$ at the opposite end, and a discharge pipe $g$ is taken from the upper tube $b$.

The delivery pipe $f$ is carried up above the cell and terminates in a funnel $h$ into which the cooling fluid is delivered through an air-gap from a cock $j$ on an overhead pipe-line or main $k$. The pipe is insulated from the main by the air-gap between the funnel $h$ and the cock $j$, and the lengths of main supplying each cell are preferably insulated from each other by the use of glass or rubber connecting sleeves 1. Where the sleeves occur the main is supported from the cells by standards $k'$ and the delivery pipe $f$ is adapted to be supported by conveniently mounted brackets which have been omitted in the drawings for clearness.

The discharge pipe $g$ is carried up above the cell to a height nearly equal to that of the supply pipe and a right-angle branch leads the fluid from the pipe $g$ into a vertical tube $m$ located outside the cell and terminating above a funnel $n$ on the upper end of a pipe $o$ leading to a discharge conduit $p$ supported below the cell.

Flattened coils of tubing may of course be employed in place of the flattened tubes $b$, $c$, described above, without altering the remainder of the construction.

The circulation of the cooling fluid will be readily followed.

Fluid from the supply main flows from the cock $j$ into the funnel $h$ and is led by the delivery pipe $f$ into the tube $c$ at one end. The fluid flows along the tube $c$ and into the tube $b$ through the junction pipe $d$ and returns along the tube $b$ from which it passes by way of the pipes $g$, $m$ and $n$, into the discharge conduit $p$.

If distilled water is employed, it is led from the conduit $p$ into a tank where it is heated or cooled as required and from which it is pumped back to the supply main $k$.

In the modifications illustrated in Figs. 3, 4 and 5, the space occupied in the cell by the circulating tubes is reduced, and the tubes are brought into closer proximity to the electrodes, by forming the tubes as passages in the usual gas collecting bells which are arranged around the upper parts of the electrodes.

In Figs. 3 and 4 the circulating tubes $q$, $r$, are inset in, and form part of, the end walls $s$ of the depending skirt of the gas collecting bell. The tubes may be built up with the skirt, or the skirt may be slotted to receive the tubes which are welded in place.

Figures 3 and 4 also show clearly the electrodes and the means for collecting the generated gases.

The electrodes 1 are parallel sheet metal plates suspended within the cell. Their lower ends are enclosed within the skirt and their upper ends within the gas collecting bell which is divided into two sets of alternate compartments 2, 3, corresponding to the polarity of the electrodes which are alternately positive and negative. When current is passed through the electrodes the gas generated on the electrodes of one polarity passes upwardly into the compartments 2 and escapes at their upper ends into the lead-off tubes 4 which carry the gas into a gas main 5 from which it is led to a storage reservoir or compressor. Similarly, the gas generated on the electrodes of the other polarity is carried up through the compartments 3 from which it passes by the tubes 6 into a second gas main.

In the alternative construction illustrated in Fig. 5, two transverse troughs or grooves $t$ are rolled or otherwise formed in the skirt of the bell. Similar troughs $u$ are rolled in a metal strip of suitable width which is welded to the skirt at the three points $v$ with the troughs $t$ and $u$ in alignment to form two tubes $w$ and $x$, and closure for the tubes being subsequently welded in place. The circulation of fluid through these tubes is substantially the same as described above with reference to Figs. 1 and 2 of the drawings, and need not be detailed further.

The presence of screwed joints between the delivery and discharge pipes and the circulating tubes within the cells, may, through defective assembly, give rise to a danger of leakage of the circulating fluid into the electrolyte, and where this might prove a serious matter, the method of mounting the tubes shown in Figs. 6 and 7 is preferred. This construction has the further advantage that the space occupied within the cell by the circulating system is less than in the other forms described above.

In this case the one end of each cooling tube $b$, $c$, is carried through the side wall of the cell $a$ into which they are welded or with which they are integrally formed. The delivery pipe $f$ and discharge pipe $g$ are connected to the tubes outside the tank, the arrangements for supplying the fluid and carrying it away being the same as before. The circulating tubes within the cell are supported by straps $y$ depending from the upper end of the cell and their inner ends are connected by a short pipe $z$ corresponding to the pipe $d$ in Figs. 1 and 2.

I claim:—

1. A temperature controlling system for the electrolyte in electrolytic cells, comprising two superimposed flattened tubes arranged across the ends of the electrodes within the cell, means connecting the end of one tube to the adjacent end of the other tube, a fluid inlet to the opposite end of one tube, and a fluid outlet from the adjacent end of the other tube.

2. A temperature controlling system for the electrolyte in electrolytic cells, comprising circulating tubes arranged within the cell at right angles to the planes of the electrodes and adjacent to the ends thereof, an overhead fluid supply line formed in insulated sections, an insulated supply pipe connecting the supply line to the circulating tubes, and an insulated discharge pipe connecting the circulating tubes to a discharge conduit.

3. A temperature controlling system for the electrolyte in electrolytic cells comprising fluid carriers arranged between the ends of the electrodes in the cell and the end walls of the cell and in a vertical plane at right angles to the planes of the electrodes, and means for circulating fluid at any desired temperature through said carriers.

4. A temperature controlling system for the electrolyte in electrolytic cells comprising fluid carrier tubes arranged between the ends of the electrodes in the cell and the end walls of the cell and in a vertical plane at right angles to the planes of said electrodes, means for supplying fluid at any desired temperature to said tubes, and means for discharging fluid from said tubes, both of said means being located at the same side of the cell.

In testimony whereof I affix my signature.

ALBERT EDGAR KNOWLES.